(12) United States Patent
Narita et al.

(10) Patent No.: US 7,597,025 B2
(45) Date of Patent: Oct. 6, 2009

(54) ARTICULATED ROBOT

(75) Inventors: Hideo Narita, Toyota (JP); Hisanori Nakamura, Toyota (JP); Morihiko Ohkura, Nishikamo-gun (JP); Masato Shirai, Nagoya (JP)

(73) Assignees: Toyota Jidosha Kabushiki Kaisha, Toyota-shi, Aichi-ken (JP); Kawasaki Jukogyo Kabushiki Kaisha, Hyogo (JP)

( * ) Notice: Subject to any disclaimer, the term of this patent is extended or adjusted under 35 U.S.C. 154(b) by 572 days.

(21) Appl. No.: 10/758,391

(22) Filed: Jan. 16, 2004

(65) Prior Publication Data

US 2004/0149064 A1 Aug. 5, 2004

(30) Foreign Application Priority Data

Jan. 17, 2003 (JP) .............................. 2003-009826

(51) Int. Cl.
*B25J 17/00* (2006.01)
(52) U.S. Cl. .............. 74/490.02; 74/490.03; 74/490.05; 901/23
(58) Field of Classification Search .............. 74/490.01, 74/490.02, 490.03, 490.05; 901/19, 23, 25, 901/28
See application file for complete search history.

(56) References Cited

U.S. PATENT DOCUMENTS

| | | | | |
|---|---|---|---|---|
| 4,840,090 A | * | 6/1989 | Iwata | ........................... 74/640 |
| 4,904,148 A | * | 2/1990 | Larsson | ...................... 414/680 |
| 5,293,107 A | * | 3/1994 | Akeel | ..................... 318/568.11 |
| 6,250,174 B1 | * | 6/2001 | Terada et al. | ............. 74/490.02 |

FOREIGN PATENT DOCUMENTS

| | | | |
|---|---|---|---|
| DE | 33 32 040 A1 | | 3/1984 |
| EP | 1 129 828 | * | 5/2001 |
| GB | 2 126 559 A | | 3/1984 |
| JP | 56-163624 | | 12/1981 |
| JP | 10-225881 | * | 8/1988 |
| JP | 63-288690 | | 11/1988 |
| JP | 6-21882 | | 3/1994 |
| JP | 2001-38672 | | 2/2001 |
| JP | 2001138279 | | 5/2001 |
| JP | 2002-264068 | | 9/2002 |
| JP | 2004148449 | | 5/2004 |
| WO | WO 01/51259 A2 | | 7/2001 |

OTHER PUBLICATIONS

Notice of Reasons for Rejection mailed Jul. 11, 2006, in corresponding Japanese Application No. 2003-009826.
German Patent Office Action dated Aug. 9, 2005, for German Patent Application No. 10 2004 002 416.2-15, 3 pages.

* cited by examiner

*Primary Examiner*—William C Joyce
(74) *Attorney, Agent, or Firm*—Finnegan, Henderson, Farabow, Garrett & Dunner, LLP

(57) ABSTRACT

An articulated robot capable of reducing dead space while maintaining a wide operating area and simplifying a power transmission system necessary for moving each joint. A plurality of joint arms A1 to A7 are connected via first rotating shafts 15, 15A, and 15B as horizontal rotating shafts and via second rotating shafts 32, 32A, and 32B as inclined rotating shafts alternately. A motor M for driving the rotating shaft and a speed-reducing mechanism are provided for each rotating shaft.

4 Claims, 8 Drawing Sheets

PRIOR ART ic robots. FIG. 8 shows one example thereof, which comprises a first arm 1 swingably attached to a base 3, a second arm 2 swingably attached to the tip of the first arm 1, and a multidirectional wrist mechanism 4 attached to the tip of the second arm. A necessary tool hand such as a welding gun or a gripper is mounted on the tip of the wrist mechanism 4 to perform robotic operations.

ARTICULATED ROBOT

BACKGROUND OF THE INVENTION

1. Field of the Invention

The present invention relates to an articulated robot mainly intended for industrial use.

2. Background Art

Polar coordinate articulated robots are often used as industrial robots. FIG. 8 shows one example thereof, which comprises a first arm 1 swingably attached to a base 3, a second arm 2 swingably attached to the tip of the first arm 1, and a multidirectional wrist mechanism 4 attached to the tip of the second arm. A necessary tool hand such as a welding gun or a gripper is mounted on the tip of the wrist mechanism 4 to perform robotic operations.

Patent Document 1 (JP Patent Publication (Kokai) No. 63-288690 A (1988)) discloses an example of the wrist mechanism, which comprises a central cylindrical body and a first and a second end cylindrical body provided at each end thereof. These three members are rotatably connected to each other such that the axes of the individual cylindrical bodies are perpendicular to each other, a rotary member at the tip of the second end cylindrical body is brought to a desired position in a three-dimensional space by rotating the individual members relative to one another. The cylindrical bodies can be rotated relative to one another via a transmission shaft and a gear transmission mechanism, the base end portion of the transmission shaft being connected to the motor as a drive source. As another example of the wrist mechanism, Patent Document 2 (JP Utility Model Publication (Kokai) No. 6-21882 U (1994)) discloses a self-contained two-axis wrist mechanism, which accommodates two motors as drive sources in a power housing.

[Patent Document 1]
JP Patent Publication (Kokai) No. 63-288690 A (1988)

[Patent Document 2]
JP Utility Model Publication (Kokai) No. 6-21882 U (1994)

The conventional robot shown in FIG. 8 is designed to ensure an operating range thereof using the lengths of the first and second arms. Since the number of joints from the base to the wrist mechanism 4 is small, the dead space attributable to bending movements of the first and second arms tends to be larger in the operating area close to the robot. Therefore, it is difficult to arrange a plurality of robots close to each other, and therefore the environment in which the robot can be used is limited.

Compact wrist mechanisms are thus known as disclosed in the above publications. However, they do not function as a robot by themselves and require a long arm. In the example described in JP Patent Publication (Kokai) No. 63-288690 A (1988), in particular, where the three cylindrical bodies are adapted to relatively rotate via transmission shafts and gear transmission mechanism, motive power is transmitted from a single motor as a drive source to all the drive shafts and, as a result, the mechanism is complicated.

SUMMARY OF THE INVENTION

In view of the above circumstances, it is the object of the present invention to provide an improved articulated robot, which can reduce the dead space while maintaining a wide operating area, and can simplify the power transmission system necessary for moving each joint.

The articulated robot according to the present invention comprises an arm having a plurality of joint arms connected to one another. In the robot, the joint arms are connected to one another via a first rotating shaft at at least one location and via a second rotating shaft at at least one location, the axis of the second rotating shaft being inclined relative to the axis of the first rotating shaft. Each rotating shaft is provided with a motor for driving the rotating shaft and with a speed-reducing mechanism.

In the articulated robot, each joint arm is provided with a motor as a drive source and with a speed-reducing mechanism, and thus a driving mechanism and a power transmission mechanism for the entire robot can be greatly simplified. A plurality of joint arms are connected via the first rotating shaft as a horizontal rotating shaft and via the second rotating shaft preferably alternately, the latter having the axis inclined relative to the axis of the first rotating shaft, thereby forming the entire arm is formed. This robot can reduce the dead space as compared with the conventional robot having first and second arms as shown in FIG. 8. Therefore, many robots of this type can be arranged closely together, resulting in improved degree of freedom regarding the environment in which the robot is used.

The angle of inclination of the second rotating shaft relative to the axis of the first rotating shaft is preferably 45°, but is not particularly limited thereto. Further, it is preferable to dispose many joint arms such that the first and second rotating shafts are alternately placed as described above, in order to make it easy to control the position of a tool hand mounted on the tip of the arm in a three-dimensional space. However, in accordance with the environment in which the robot is used, two or more connecting portions via the second rotating shafts (inclined rotating shafts), for example, may continue. In such case, the second rotating shafts may have different angles of inclination relative to the first rotating shaft.

According to one embodiment of the articulated robot of the present invention, the first and second rotating shafts each have a hollow part. Cables or the like necessary for operating the articulated robot (such as cables, piping, or wires for operating a tool hand mounted on the tip of arm), or wires for motors placed at upper levels are passed and arranged through the hollow part. In this embodiment, there are no cables and wires present outside the arm, so that the risk of the arm coming into contact with equipment around the robot can be avoided and it is possible to arrange robots close to each other and place a workpiece closer to the robot. As a result, a safe operating environment is ensured and the space necessary for the movement of the robot is reduced.

According to another embodiment of the articulated robot of the present invention, each joint arm is provided with a single motor for driving either the first or second rotating shaft connected thereto. Further, according to still another embodiment, the plurality of joint arms comprise joint arms having the first rotating shaft on one end and the second rotating shaft on the other end. Among such plurality of joint arms with first and second rotating shafts, joint arms having two motors for driving the first and second rotating shafts and joint arms with no motor are alternately connected. The full length of the arm in the latter embodiment can be made shorter than that in the former one due to the presence of joint arms with no motors, even though the robots have the same number of joints. When the robot is required to perform robotic operations at a low height, the latter embodiment is highly advantageous.

In general, the motor used for a robot of this type is usually provided integrally with an encoder and a brake for position control in addition to a main motor body as a driving device.

Consequently, the total length of such motor increases, and the tip thereof tends to protrude from the casing constituting the joint arm when the motor is mounted inside the joint arm. When the motor protrudes outside from the joint arm as described above, a large surrounding space would be necessary to eliminate interference with the surroundings. Increasing the diameter of the joint arm would be able to prevent protrusion, but that would be against the original spirit of the present invention, which is to attempt to reduce the space required by the articulated robot.

In view of such circumstances, yet another embodiment of the articulated robot according to the present invention has been made. In the articulated robot of the present embodiment, at least one joint arm is provided with a brake device independent of the motor, the brake device being disposed in parallel with the motor relative to gears constituting a speed-reducing mechanism. In this embodiment, the total length of the motor can be made short, and the entire driving system can easily be accommodated in a corresponding joint arm without making the diameter of the joint arm larger.

DESCRIPTION OF PREFERRED EMBODIMENTS

Figure 1:
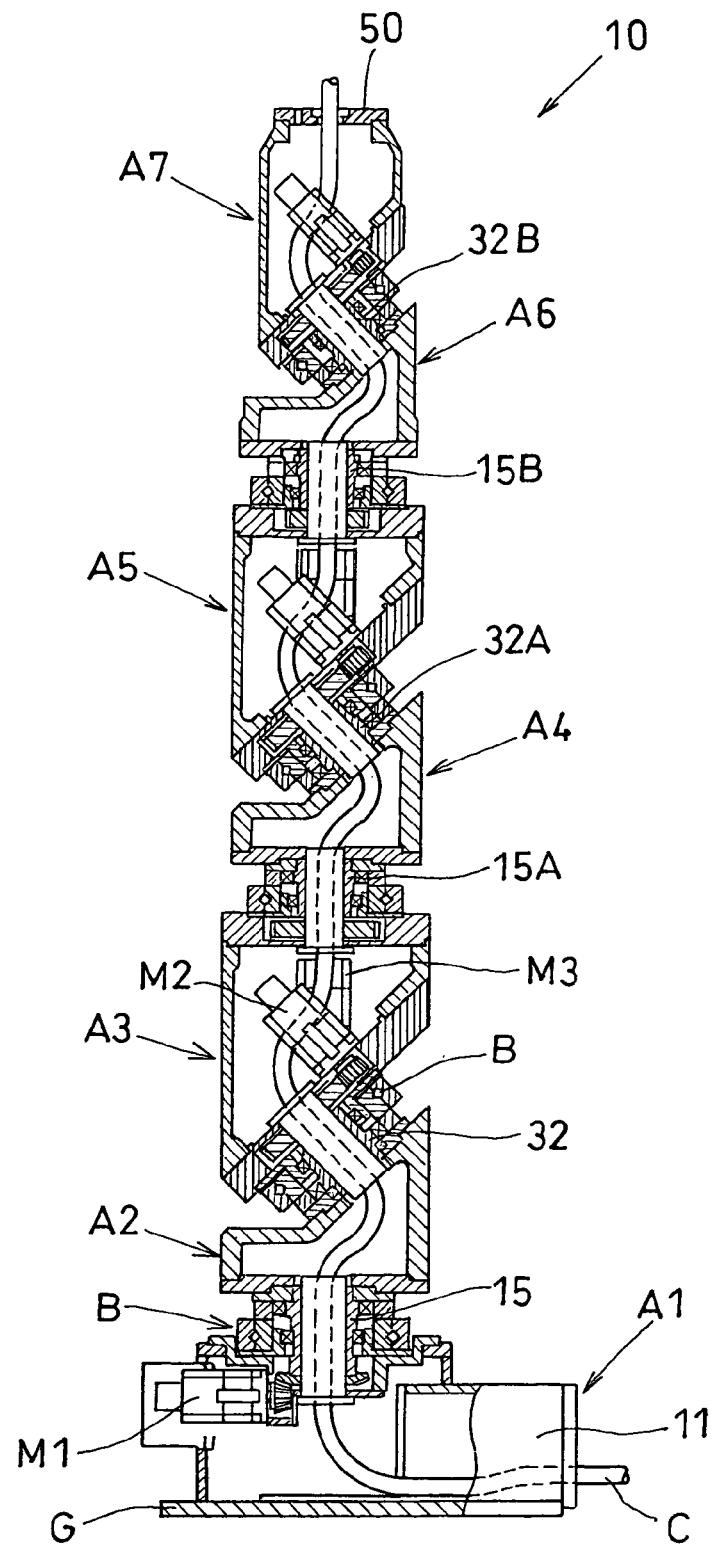
FIG. 1 is an overall view of one embodiment of an articulated robot according to the present invention.
Figure 2:
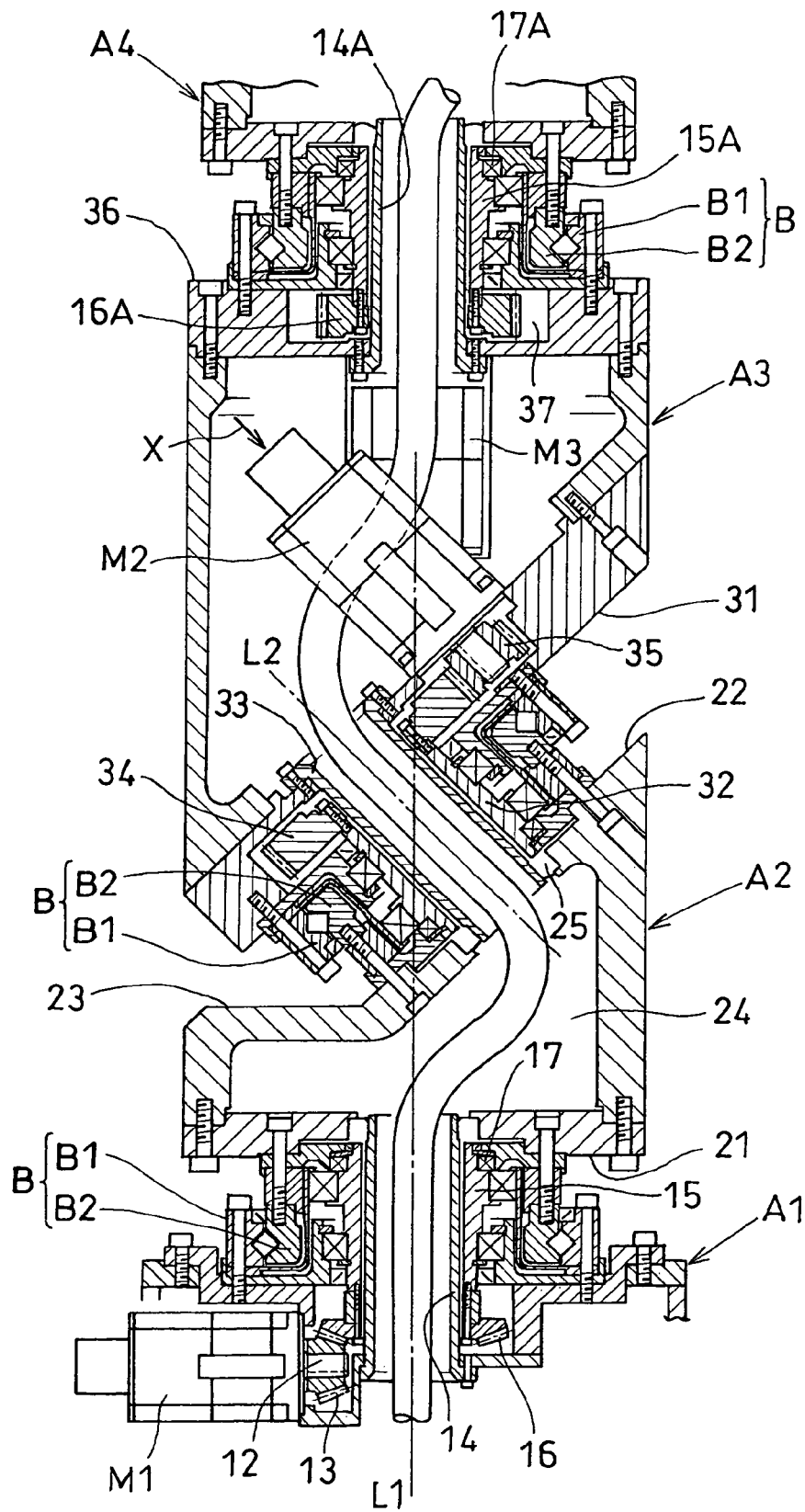
FIG. 2 is an enlarged cross-sectional view of a part of the robot of FIG. 1.

Hereafter the present invention will be described by referring to embodiments. FIGS. 1 and 2 illustrate an articulated robot 10 according to one embodiment of the present invention. In this embodiment, the robot has six joints and seven joint arms. A first joint arm A1 is fixed on a base G to function as a machine table. It is provided with a motor M1 as a driving power source and an introduction opening 11 for cables. The motor M1 has built inside an encoder and a braking device. The motor has a rotating drive shaft 12 disposed in a horizontal direction, and a bevel gear 13 is mounted on the tip of the drive shaft.

A hollow fixed shaft 14 is vertically disposed in the first joint arm A1, and a horizontal rotating shaft 15 (corresponding to "a first rotating shaft" of the present invention) is fitted about the shaft 14. A bevel gear 16 is mounted at the lower end of the horizontal rotating shaft 15 and is engaged with the bevel gear 13 mounted on the rotating drive shaft 12 of the motor. The mesh between the bevel gears 13 and 16 forms a speed-reducing mechanism. As shown in detail in an enlarged view of FIG. 2, an outer race B1 of a bearing B is fixed on an upper end surface of the first joint arm A1 concentrically with an axis L1 of the hollow fixed shaft 14 (as well as of the horizontal rotating shaft 15). An inner race B2 of the bearing B is fixed on the horizontal rotating shaft 15 via proper means.

A lower end surface 21 of a second joint arm A2, which is cylindrical in shape, is fixed on an upper end of the shaft 15 via a thrust bearing 17, for example. Accordingly, when the motor M1 rotates, the rotation is transmitted to the horizontal rotating shaft 15 via the bevel gears 13 and 16, so that the second joint arm A2 can turn in a 360° range. This horizontal rotating shaft 15 constitutes a first joint.

The second joint arm A2 is cylindrical. It has an upper end surface formed of an inclined plane 22 inclined at angle of 45° to its own axis (which coincides with the axis L1) and a horizontal plane 23 extending therefrom, and has an internal space 24. The horizontal plane 23 is provided to lower the height of the second joint arm A2. Therefore, if there is no height limitation, the entire upper end surface may be formed of the inclined plane 22.

On the second joint arm A2, a third cylindrical joint arm A3 is mounted. A lower end surface of the arm A3 is formed of an inclined plane 31 inclined at 45° to the axis. The second joint arm A2 and the third joint arm A3 are connected via the inclined planes 22 and 31 such that they can be rotated relative to each other about an inclined rotating shaft 32 (corresponding to "a second rotating shaft" of the present invention) having an axis L2 inclined at 45° to and thus intersecting the axis L1.

More specifically, the inclined plane 22 of the second joint arm A2 is formed with an opening 25 centered about the axis L2, and an inner race B2 of a bearing B is fixed concentrically with the axis L2 in the same manner as the aforementioned bearing B. Meanwhile, a hollow fixed shaft 33 centered about the axis L2 is mounted on the inclined plane 31 of the third joint arm A3 perpendicular to the plane 31. The fixed shaft 33 reaches to the space 24 of the second joint arm A2. The inclined rotating shaft 32 is fitted about the fixed shaft 33, and a gear 34 is mounted on an upper end of the shaft 32 (towards the third joint arm A3). The circumferential part of the inclined rotating shaft 32 is made integral via proper means with an outer race B1 of the bearing B fixed on the inclined plane 31 of the third joint arm A3.

A motor M2 is provided inside the third joint arm A3, and a gear 35 mounted on a rotating drive shaft of the motor M2 is in mesh with the gear 34. Accordingly, when the motor M2 rotates, the rotation is transmitted to the inclined rotating shaft 32 via the gears 35 and 34. The third joint arm A3 can thereby rotate relative to the second joint arm A2 in a 360° range. This inclined rotating shaft 32 constitutes a second joint.

An upper end surface of the third joint arm A3 is formed of a horizontal plane 36, on which a horizontal rotating shaft 15A is mounted in substantially the same manner as on the upper end surface of the first joint arm A1. Namely, the horizontal plane 36 is formed with an opening 37 at the center, the axis of which coincides with the axis L1 when the robot is in a vertical position as a whole as shown in the figure. A hollow fixed shaft 14A is fixed in a vertical direction and has a central axis coincidental with the axis of the opening 37. A horizontal rotating shaft 15A is fitted about the fixed shaft 14A.

A gear 16A is mounted on a lower end of the horizontal rotating shaft 15A, and it is meshed with a gear (not shown in FIGS. 1 and 2) mounted on a rotating drive shaft of a motor M3 mounted inside the third joint arm A3. On the horizontal upper end surface 36 of the third joint arm A3, an outer race B1 of a bearing B is fixed concentrically with the axis of the fixed shaft 14A, and an inner race B2 of the bearing B is fixed on the circumferential portion of the horizontal rotating shaft 15A via proper means. On the upper end of the horizontal rotating shaft 15A, a fourth joint arm A4 having the same structure as the second joint arm A2 is fixed via a thrust bearing 17A or the like in the same manner. Accordingly, when the motor M3 rotates, the rotation is transmitted to the horizontal rotating shaft 15A via the gear of the motor M3 and the gear 16A, thereby enabling the fourth joint arm A4 to rotate relative to the third joint arm A3 in a 360° range. This horizontal rotating shaft 15A constitutes a third joint.

On the fourth joint arm A4, a fifth joint arm A5 having the same structure as the third joint arm A3 is disposed in the same manner, and an inclined rotating shaft 32A connecting the fourth and fifth joint arms constitutes a fourth joint. Further, on the fifth joint arm A5, a sixth joint arm A6 having the same structure as the second joint arm A2 is disposed in the same manner, and a horizontal rotating shaft 15B connecting the fifth and sixth joint arms constitutes a fifth joint. A seventh joint arm A7 is disposed on the sixth joint arm A6 in the same manner as above, which has a flat surface 50 formed by removing the horizontal rotating shaft 15A or 15B from the upper end of the third or fifth joint arm A3 or A5. An inclined rotating shaft 32B connecting the sixth and seventh arms constitutes a sixth joint. The flat surface 50 of the seventh joint arm A7 is used for mounting a tool hand such as a welding gun, a painting gun or a gripper, thus completing an articulated robot 10 having six joints.

In FIGS. 1 and 2, a sign "C" represents cables, piping, wires, or the like necessary for operating the articulated robot 10. They are introduced to where they are required through the space inside each joint arm and the hollow part formed in each rotating shaft. Thus, the cables, wires, or the like are not placed outside the joint arm, thereby avoiding the risk of the cables, etc. coming into contact with equipment near the robot. Needless to say, the cables, etc. may be disposed without the use of the aforementioned hollow part. In such case, the hollow part formed in each rotating shaft would not be necessary.

In the above embodiment, the third and fifth joint arms A3 and A5 each accommodate two drive motors (e.g., M2 and M3), one for the horizontal rotating shaft and one for the inclined rotating shaft, disposed at the top and bottom of the arm. The second, fourth, and sixth joint arms A2, A4, and A6 do not accommodate a drive motor. This allows the total length of the second, fourth, and sixth joint arms A2, A4, and A6 to be shorter than that in a case where each arm accommodates a single motor. Thus, the total length of the robot according to the present embodiment can be made shorter compared with that of a robot wherein a drive motor is arranged in each joint arm, even though both robots have the same number of joints.

Figure 3:
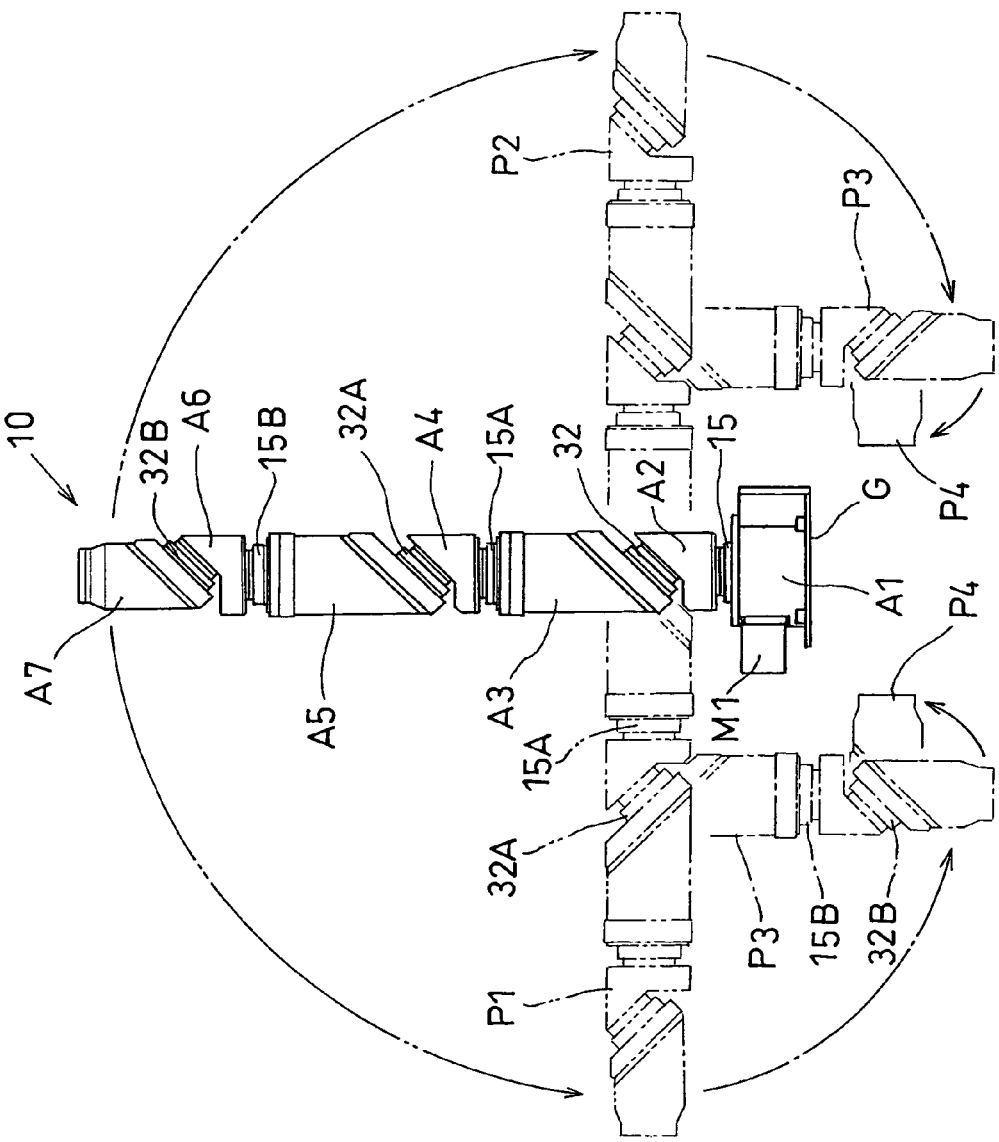
FIG. 3 illustrates the operating range of the articulated robot of FIG. 1.

FIG. 3 describes the operating range of the articulated robot 10 of FIGS. 1 and 2 in a vertical plane. When the second joint (inclined rotating shaft 32) is rotated by 180° by rotating the motor M2, the robot changes its posture from a vertical one to a horizontal one shown as P1 or P2. When the motor M1 rotates while the robot is in the horizontal posture, the first joint (horizontal rotating shaft 15) rotates so that the robot can rotate in a 360° range while maintaining the horizontal posture. When the fourth joint (inclined rotating shaft 32A) is rotated by 180° from P1 or P2 posture, the part extending beyond the fourth joint changes from a horizontal posture to a vertical one shown as P3. When the third joint (horizontal rotating shaft 15A) is rotated while such a posture is maintained, the part beyond the fourth joint can be moved in a 360° range within a vertical plane. Further, when the sixth joint (inclined rotating shaft 32B) is rotated by 180° while the P3 posture is maintained, the part beyond the sixth joint changes from a vertical posture to a horizontal one shown as P4. When the fifth joint part (horizontal rotating shaft 15B) is rotated while such a posture is maintained, the part beyond the sixth joint can be moved in a 360° range within a horizontal plane. A curve drawn by the tip of the robot shown in FIG. 3 describes the trajectory of the movement of the outermost edge of the robot, indicating the maximum operating range of the robot shown in FIG. 1.

Figure 4:
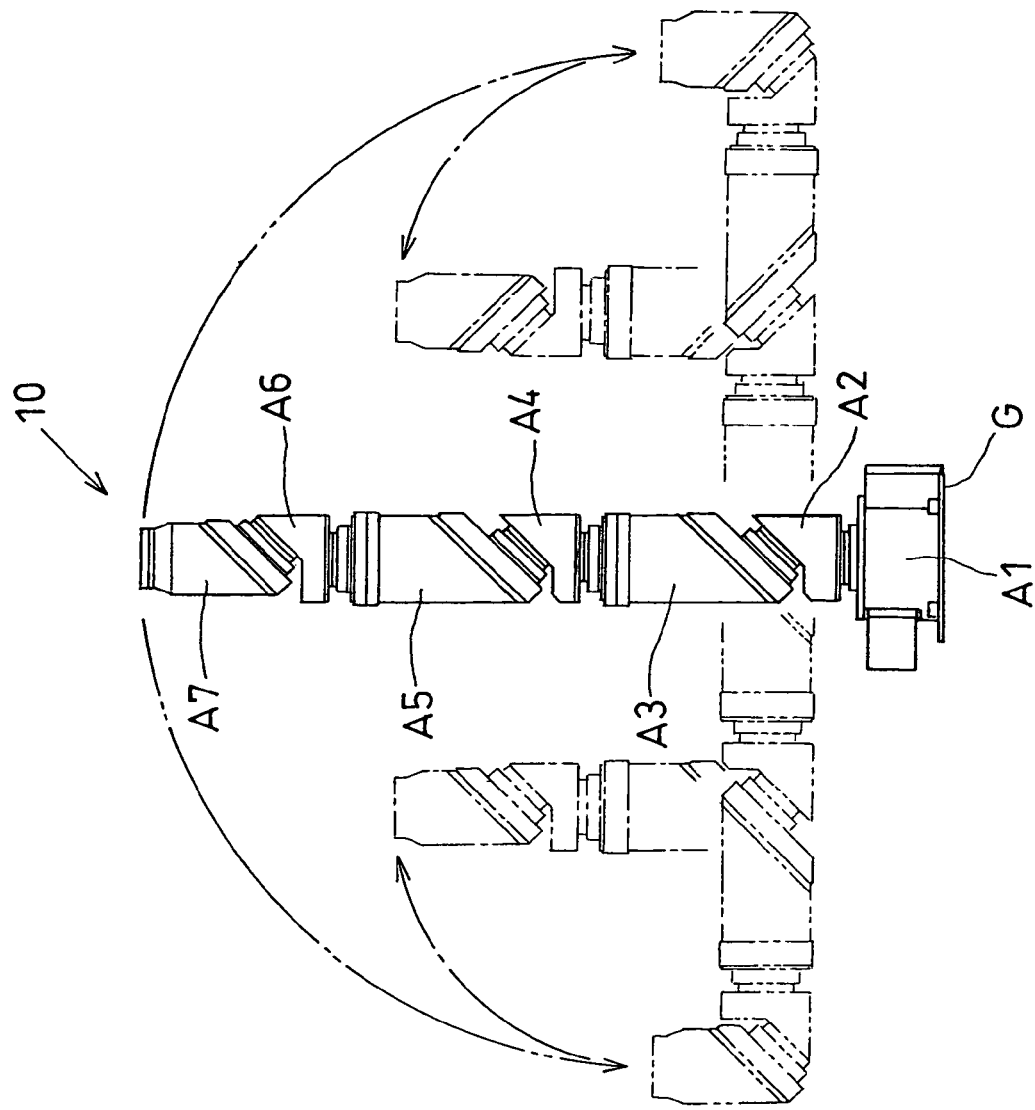
FIG. 4 is another view illustrating the operating range of the articulated robot of FIG. 1.

FIG. 4 shows the operating range of the robot when its tip part takes a vertical posture. Although the specific movements of each joint would not be described, the maximum operating range of the robot of FIGS. 1 and 2 when it takes the above posture can be grasped by a curve drawn by the tip of the robot as in the case of FIG. 3.

Figure 5:
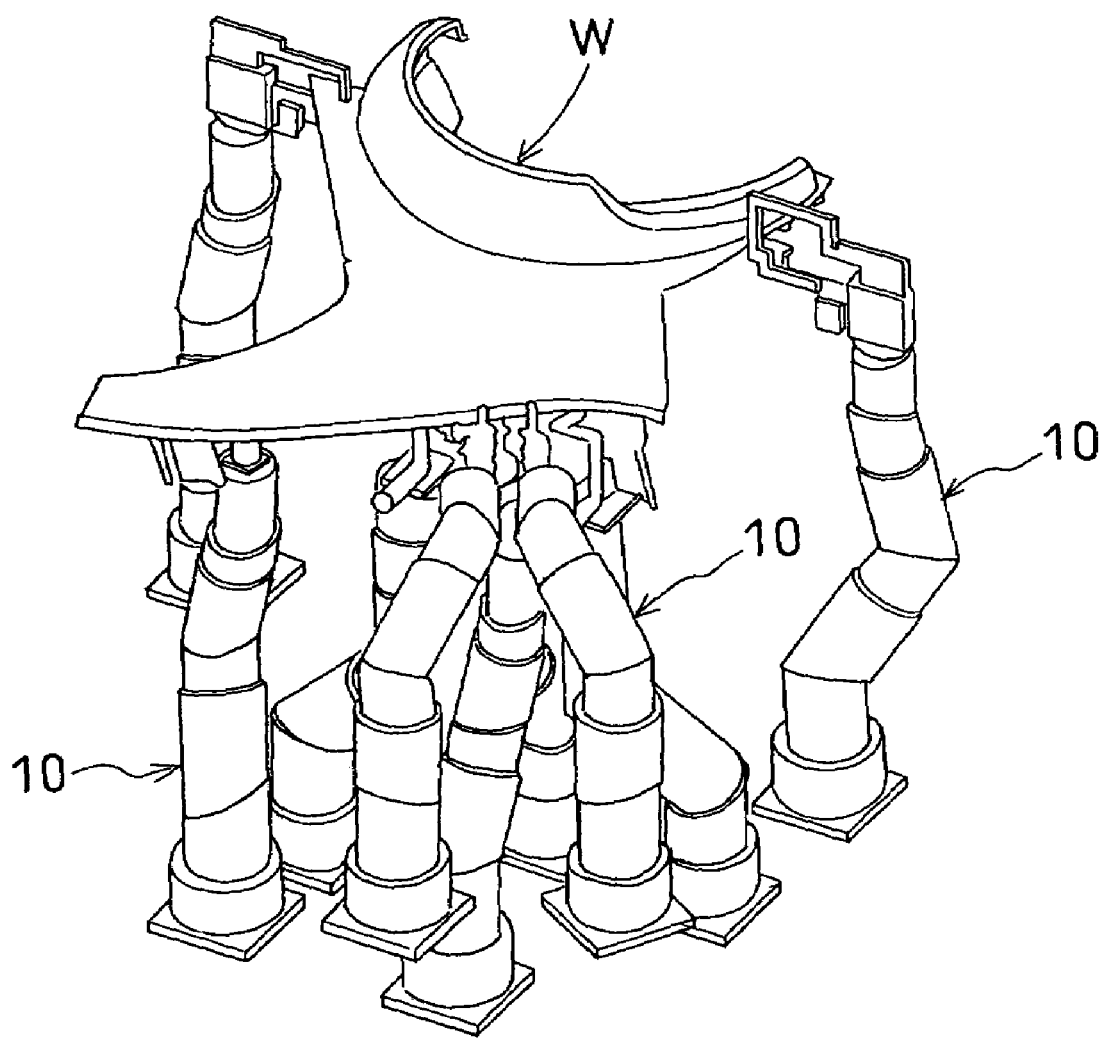
FIG. 5 illustrates one embodiment of the manner in which the articulated robot according to the present invention is used.

FIG. 5 shows an example of the manner in which the above articulated robot 10 is used. The articulated robot according to the present invention can be provided with many joints between the base and the other end for mounting a tool hand such as a welding gun or a gripper in a simple structure. Therefore, the dead space in the operating range can be greatly reduced, as compared with a conventional robot. This allows a plurality of articulated robots 10 to be placed closely to each other in a small area as shown in the figure, and thus the robots can be used as holding robots for holding a workpiece W to be welded in addition to being used as a conventional welding robot equipped with a welding gun. The same group of robots can easily hold workpiece W of various types, shapes and sizes, which is highly advantageous for practical use.

Figure 6:
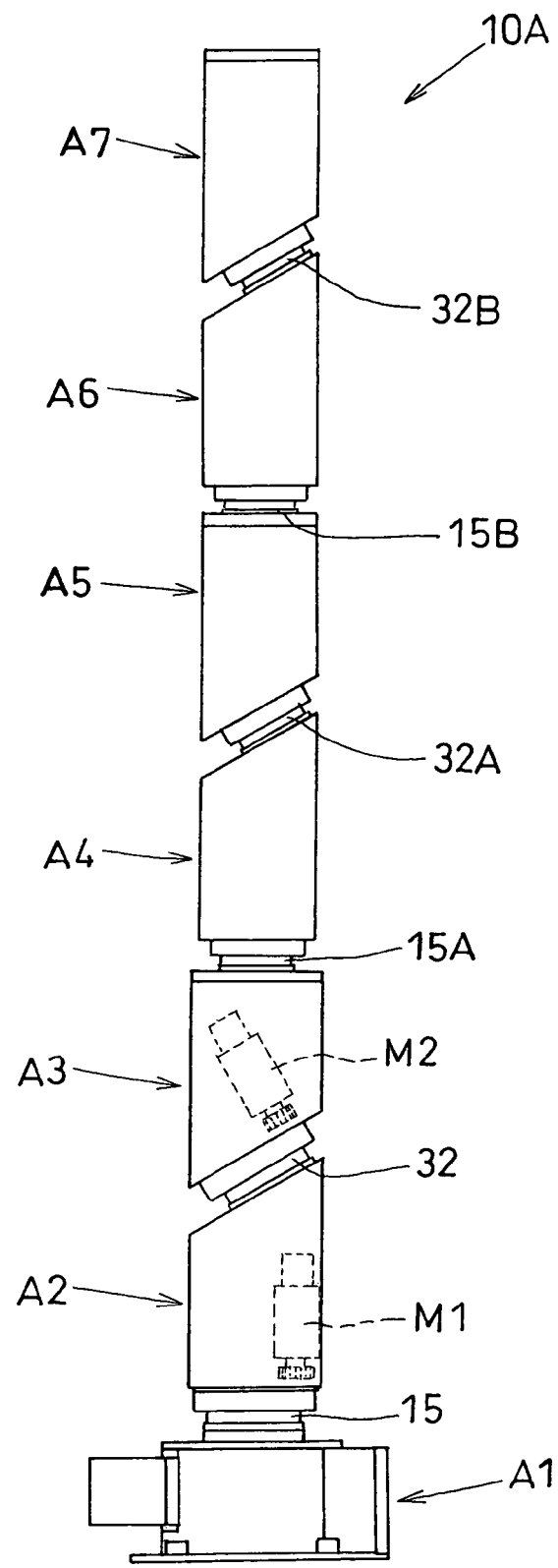
FIG. 6 is an overall view showing another embodiment of the articulated robot according to the present invention.

FIG. 6 shows an articulated robot 10A according to another embodiment. Each joint arm herein is provided with a single drive motor. Namely, a motor M1 is mounted inside joint arm A2 to control a first joint (horizontal rotating shaft 15), and a motor M2 is mounted inside joint arm A3 to control a second joint (inclined rotating shaft 32). Likewise, a motor is mounted inside each of the subsequent joint arms up to joint arm A7. In this embodiment, since all the joint arms have a drive motor, each joint arm has a longer length. However, each arm advantageously has a smaller diameter. The operation and operating range of the robot according to this embodiment are the same as the aforementioned embodiment and would not be described.

Figure 7:
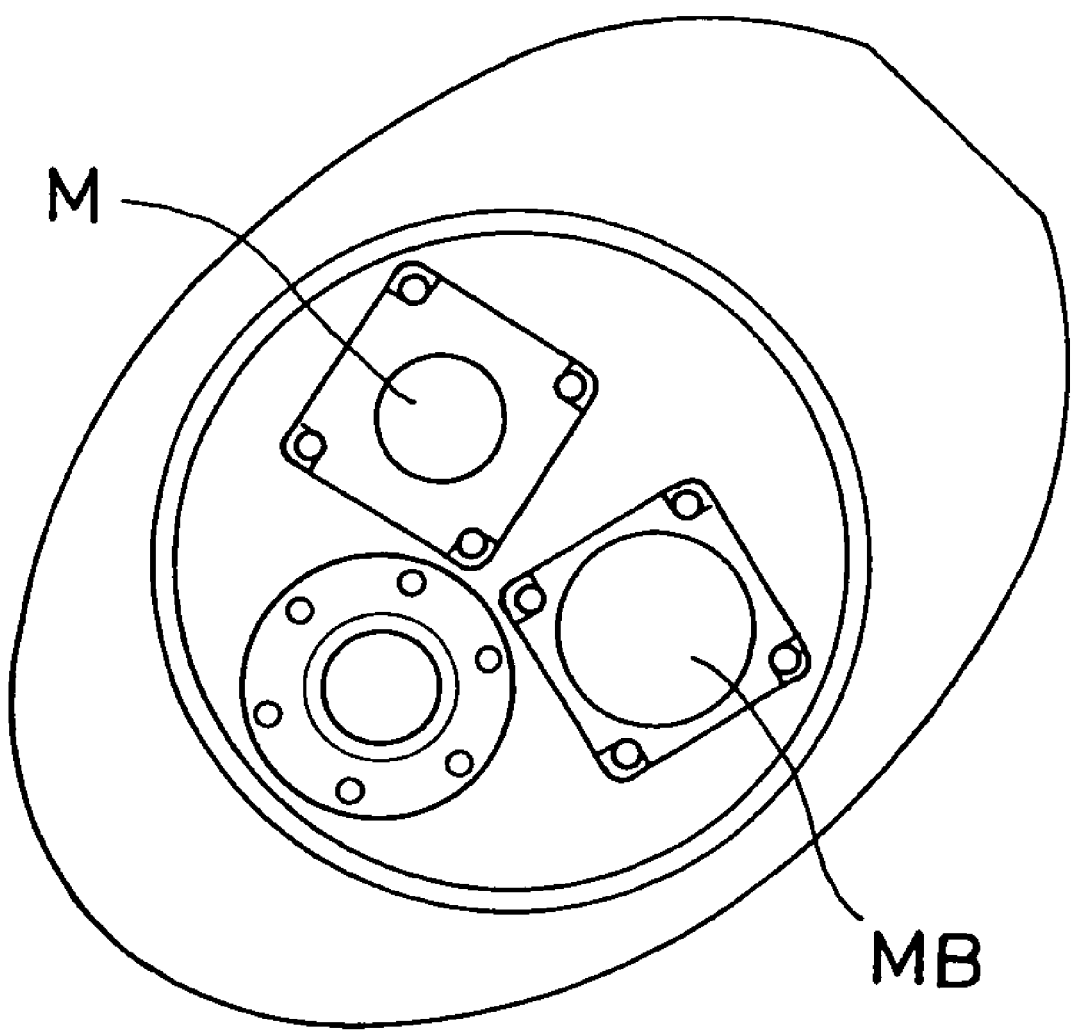
FIG. 7 is a partial view illustrating yet another embodiment.
Figure 8:
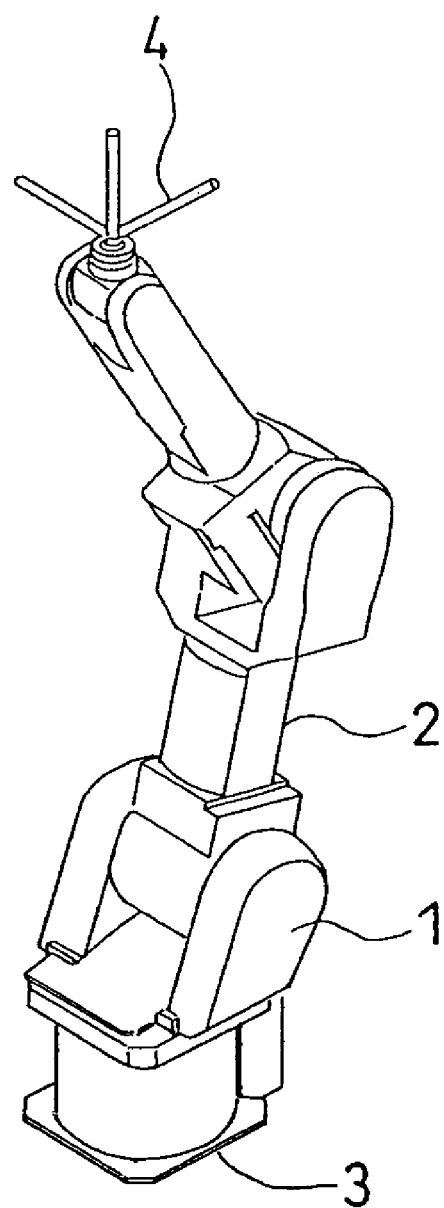
FIG. 8 illustrates a conventional industrial robot.

FIG. 7 shows the robot according to yet another embodiment when viewed from the direction of arrow X in FIG. 2. While it has been described with reference to the articulated robot shown in FIGS. 1 and 2 that the motor has built inside an encoder and a brake device, in this embodiment a brake device MB is provided independently of the motor M. The brake device MB is arranged in parallel with the motor M relative to the gears constituting the speed-reducing mechanism. In this embodiment, the total length of the motor can be reduced, so the whole drive system can easily be contained in a corresponding joint arm.

The aforementioned description demonstrates several preferable embodiments of the articulated robot according to the present invention, and many other embodiments are possible. For example, while the robot has been described as having six joints, the number of joints may be greater or smaller than that. As far as there is at least one horizontal rotating shaft and at least one inclined rotating shaft, the articulated robot of the present invention can be formed. In accordance with the environment in which the robot is used, the number of joints may properly be determined. Further, while it has been described above that the horizontal rotating shafts and inclined rotating shafts are alternately arranged, two or more inclined rotating shafts may be arranged in series. In such cases, it is desirable that the angle of inclination of the inclined rotating shaft is smaller than 45° relative to the vertical axis as a reference. Also, in the embodiment shown in FIGS. 1 and 2, the angle of inclination of the inclined rotating shaft may be other than 45° relative to the vertical axis as a reference. The speed-reducing mechanism is also not limited to the gear speed reducing mechanism, and other types of speed-reducing mechanism may be employed either alone or in combination with a gear speed-reducing mechanism.

The present invention provides an improved articulated robot in which the dead space is reduced while maintaining a wide operating area, and in which the power transmission system necessary for moving each joint is greatly simplified.

What is claimed is:

1. An articulated robot comprising:
a plurality of joint arms connected to one another, wherein each of the joint arms is connected to an adjacent joint arm via a rotating shaft, wherein the axis of a second rotating shaft at one end of one of the plurality of joint arms is inclined relative to the axis of a first rotating shaft at the other end of the one of the plurality of the joint arms, wherein each rotating shaft is provided with a motor for driving the rotating shaft and with a speed-reducing mechanism, wherein the plurality of joint arms include a first joint arm having two motors for driving the first and second rotating shafts and a second joint arm with no motor, the first arm having a longer length than the second arm, and wherein the second joint arm is adjacently connected to the first joint arm.

2. The articulated robot according to claim 1, wherein each of the first and second rotating shafts has a hollow part through which a cable or the like necessary for controlling the articulated robot is passed.

3. The articulated robot according to claim 2, wherein at least one joint arm is provided with a brake device independent of the motor, the brake device being disposed in parallel with the motor relative to gears constituting a speed reducing mechanism.

4. The articulated robot according to claim 1, wherein at least one joint arm is provided with a brake device independent of the motor, the brake device being disposed in parallel with the motor relative to gears constituting a speed reducing mechanism.

* * * * *